(12) United States Patent
McGuffin

(10) Patent No.: US 7,874,548 B1
(45) Date of Patent: Jan. 25, 2011

(54) FLOATATABLE AERATOR SYSTEM

(76) Inventor: Thomas R. McGuffin, 4549 Baybrook Dr., Pensacola, FL (US) 32514

( * ) Notice: Subject to any disclaimer, the term of this patent is extended or adjusted under 35 U.S.C. 154(b) by 1076 days.

(21) Appl. No.: 11/639,028

(22) Filed: Dec. 14, 2006

(51) Int. Cl.
*B01F 3/04* (2006.01)
(52) U.S. Cl. ............... 261/120; 261/121.1; 261/123; 261/124; 210/242.2
(58) Field of Classification Search ............ 261/120, 261/121.1, 123, 124; 210/747, 242.2
See application file for complete search history.

(56) References Cited

U.S. PATENT DOCUMENTS

| | | | |
|---|---|---|---|
| 3,794,303 A * | 2/1974 | Hirshon | 261/61 |
| 4,151,231 A | 4/1979 | Austin et al. | |
| 4,190,619 A * | 2/1980 | Cherne | 261/92 |
| 4,304,740 A | 12/1981 | Cernoch | |
| 4,532,037 A | 7/1985 | Willinger | |
| 4,684,462 A | 8/1987 | Augustyniak | |
| 4,776,127 A | 10/1988 | Jackson | |
| D320,838 S | 10/1991 | Carlson | |
| 5,223,130 A * | 6/1993 | Valfrido | 210/170.02 |
| 5,330,639 A * | 7/1994 | Murphree | 210/170.05 |
| 6,599,426 B2 | 7/2003 | Drie | |
| 6,743,357 B2 | 6/2004 | Keeton, Jr. | |

* cited by examiner

*Primary Examiner*—Scott Bushey
(74) *Attorney, Agent, or Firm*—George L. Williamson

(57) ABSTRACT

A method and apparatus for a flotatable aerator system that includes a concaved surface at the top of a fluid uptake chamber for diverting aerated fluid behind a chassis of the system. The chassis is supported by floats and includes a bank of fluid outlets created by a plurality of parallel baffle walls. The baffle walls add structural support to the chassis. Elongated end baffle walls create a semi-enclosed area for the discharge of the aerated fluid.

14 Claims, 5 Drawing Sheets

FLOATATABLE AERATOR SYSTEM

BACKGROUND OF THE INVENTION

1. Field of the Invention

The present invention generally relates to aerators and, more particularly, is concerned with a method and apparatus for a floatatable aerator system for use in waste water treatment systems, ponds and sewage systems.

Aerator systems are well known but are problematic for small farmers and small industrial industries. Most water reservoir aerator systems are complex to use, costly to operate, and require large amounts of space to install.

As will be seen more fully below, the present invention is substantially different in structure, methodology and approach from that of known aerator systems.

2. Description of the Prior Art

Aerators have been described in the prior art. However, none of the prior art discloses the unique features of the present invention. While these aerators may be suitable for the purposes in which they were designed, they would not be suitable for the purposes of the present invention as hereinafter described.

SUMMARY OF THE PRESENT INVENTION

The preferred embodiment of the floatatable aerator system of the present invention solves the aforementioned problems in a straight forward and simple manner.

Broadly, the present invention contemplates a method and apparatus for a floatatable aerator system comprising a hollow chamber supported by floats, the chamber having a concaved rear surface, a fluid intake chamber having a fluid inlet and a top aerated fluid diverter created by the concaved rear surface; a fluid aerator assembly for injecting air into fluid received through the fluid inlet to form aerated fluid; and, a bank of lateral outlet ports for expelling the diverted aerated fluid funneled along the concaved rear surface.

An object of the present invention is to provide a floatatable aerator system that is compact.

A further object of the present invention is to provide a floatatable aerator system that includes a pair of elongated end walls that semi-enclose an area of fluid in a pond, reservoir, etc., where the aerated fluid is channeled.

A feature of the present invention is to provide a floatatable aerator system that is relatively simple structurally and thus easy to manufacture.

The above and other objects and features of the present invention will become apparent from the drawings, the description given herein, and the appended claims.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
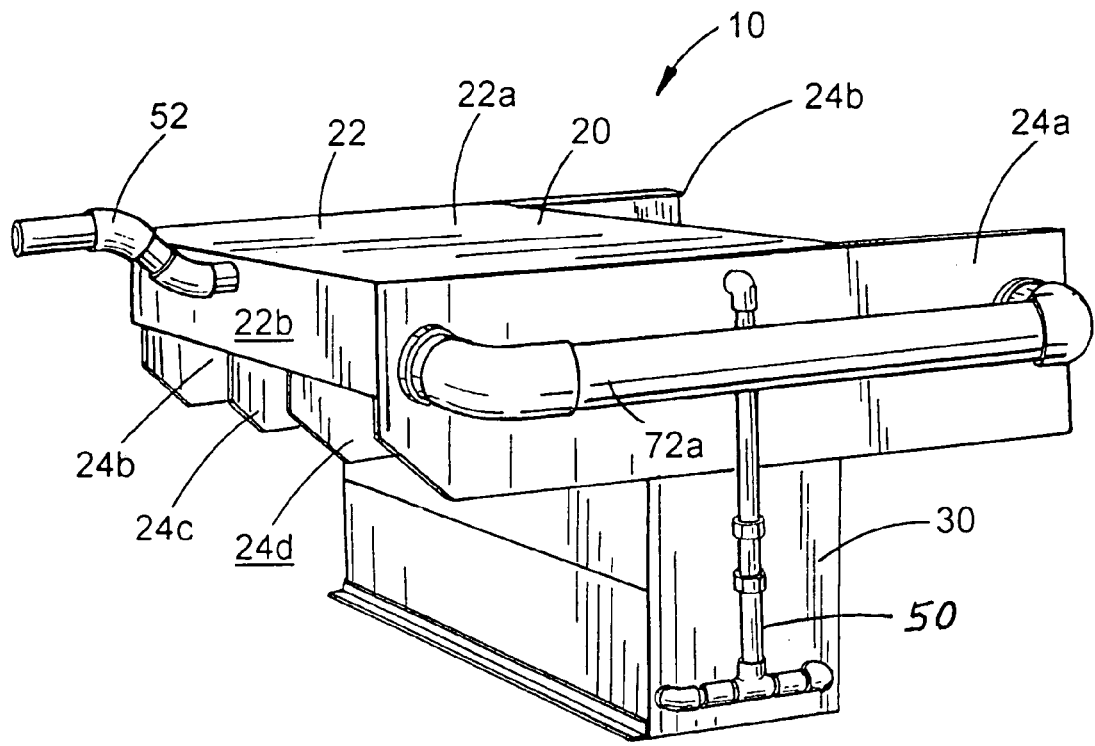
FIG. 1 is a perspective view of the floatatable aerator system in accordance with the present invention.
Figure 2:
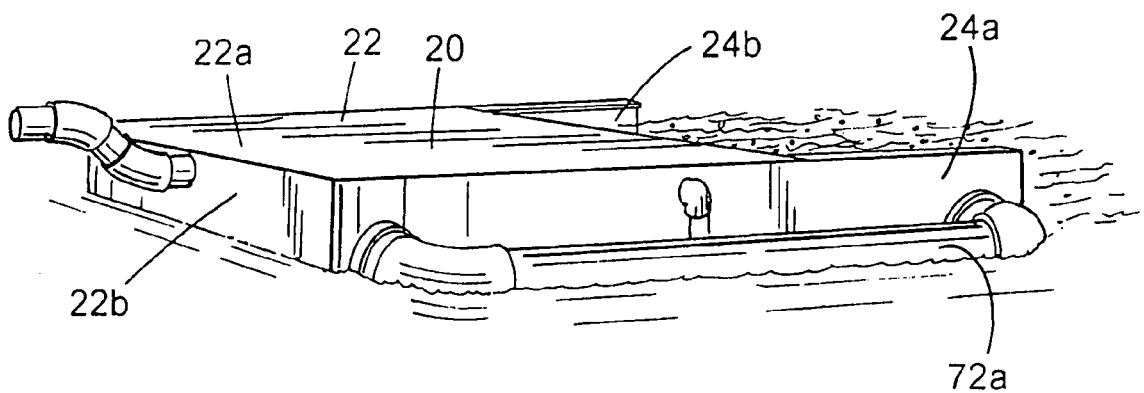
FIG. 2 is a perspective view of the floatatable aerator system in accordance with the present invention submerged and floating in water.

With regard to reference numerals used, the following numbering is used throughout the drawings.

10 present invention
12 fluid
20 aerator chassis
22 top hollow chamber
22a top wall
22b front wall
22c concaved back wall
24a end baffle wall
24b end baffle wall
24c baffle wall
24d baffle wall
30 fluid uptake chamber
32 inlet port
34a discharge port
34b discharge port
34c discharge port
50 aerating system
52 air inlet port
54 primary tube
56 air splitter
58a secondary tube
58b secondary tube
60a vertical side tube
60b vertical side tube
62 elongated tubular members
64 spaced apart apertures
70 flotation device
72a exterior float member
72b exterior float member
74 front float member

DETAILED DESCRIPTION OF THE PREFERRED EMBODIMENT

The following discussion describes in detail at least one embodiment of the present invention. This discussion should not be construed, however, as limiting the invention to those particular embodiments since practitioners skilled in the art will recognize numerous other embodiments as well. For a definition of the complete scope of the invention, the reader is directed to the appended claims. FIGS. 1-9 illustrate the present invention wherein a floatatable aerator system is disclosed.

Turning to FIGS. 1-8, the floatatable aerator of the present invention is generally referenced by the numeral 10. Therein is shown the present invention 10 generally comprised of a floatatable aerator chassis 20 having an aerating system 50 coupled thereto, the aerating system 50 aerating fluid 12 flowing through the aerator chassis 20.

Figure 3:
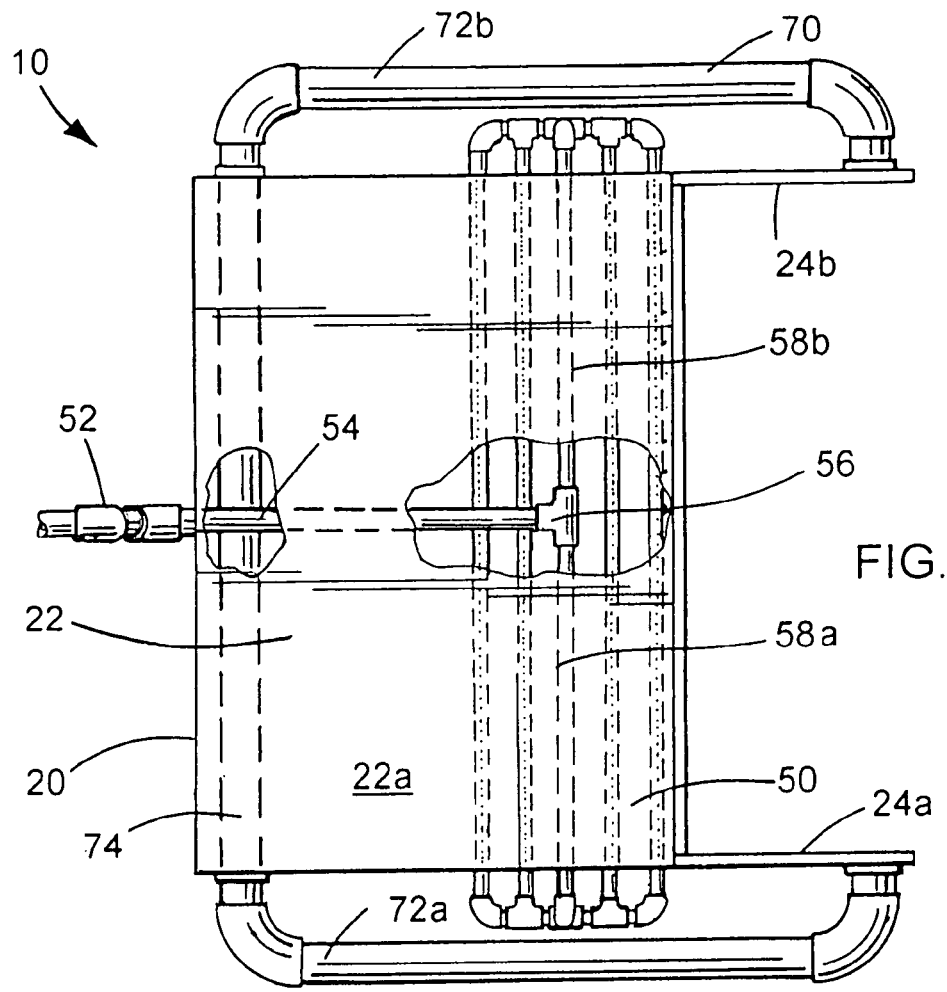
FIG. 3 is a top view of the floatatable aerator system in accordance with the present invention.
Figure 4:
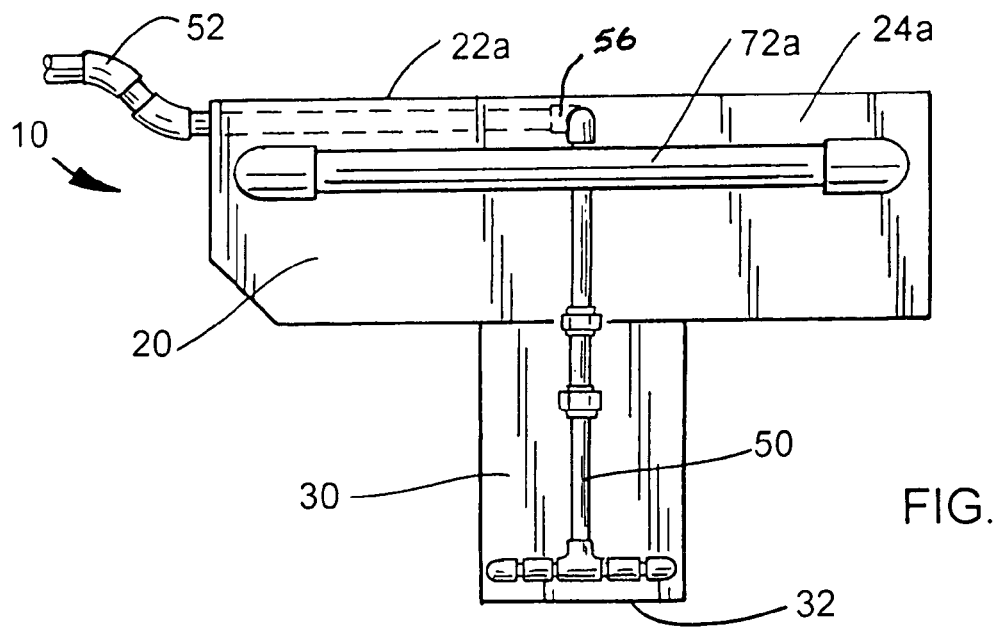
FIG. 4 is a side view of the floatatable aerator system in accordance with the present invention.
Figure 5:
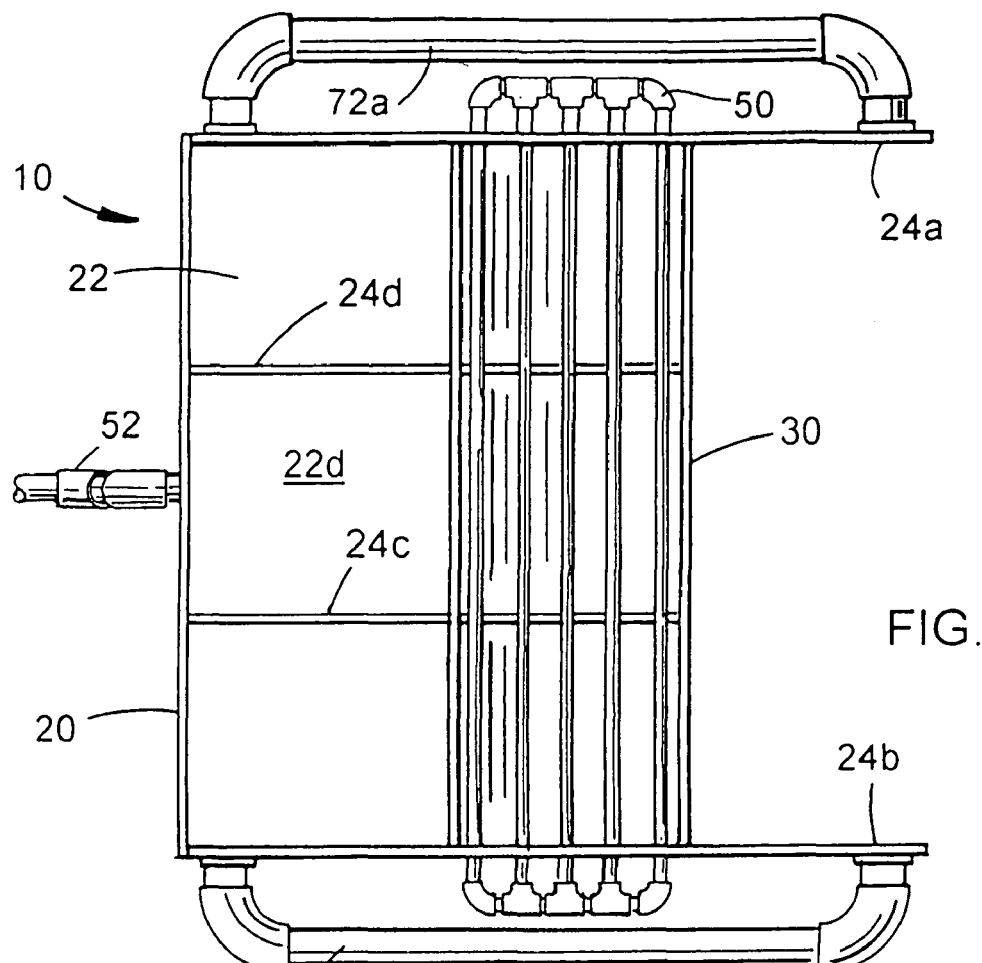
FIG. 5 is a bottom view of the floatatable aerator system in accordance with the present invention.
Figure 6:
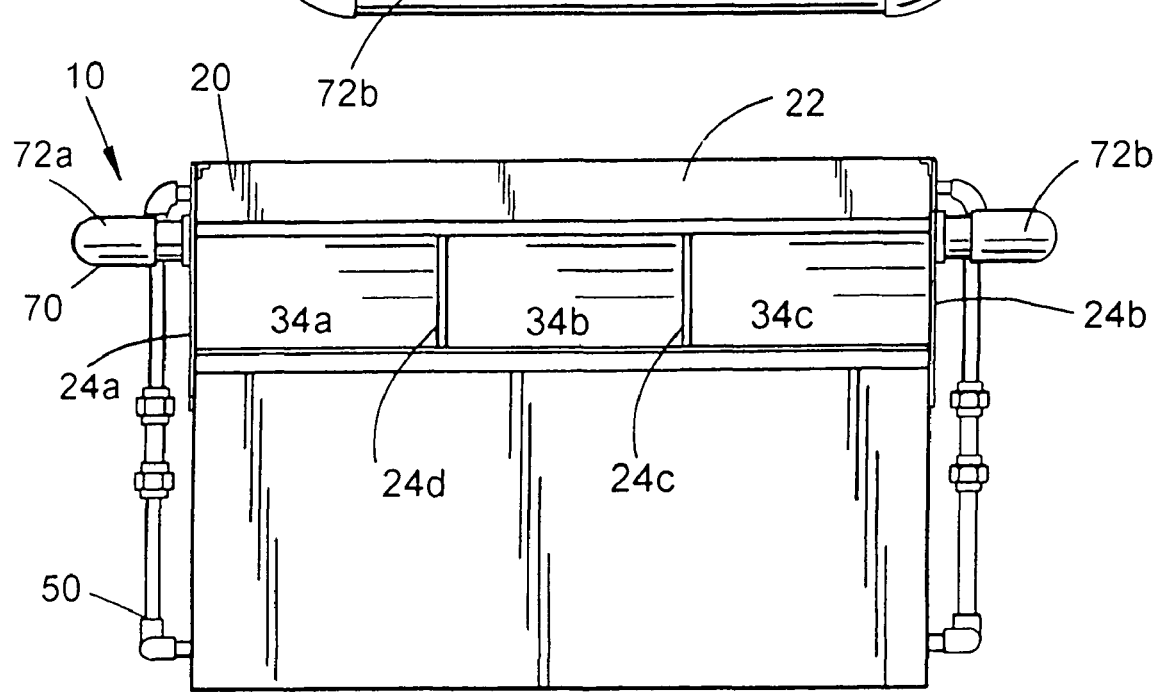
FIG. 6 is a back view of the floatatable aerator system in accordance with the present invention.
Figure 7:
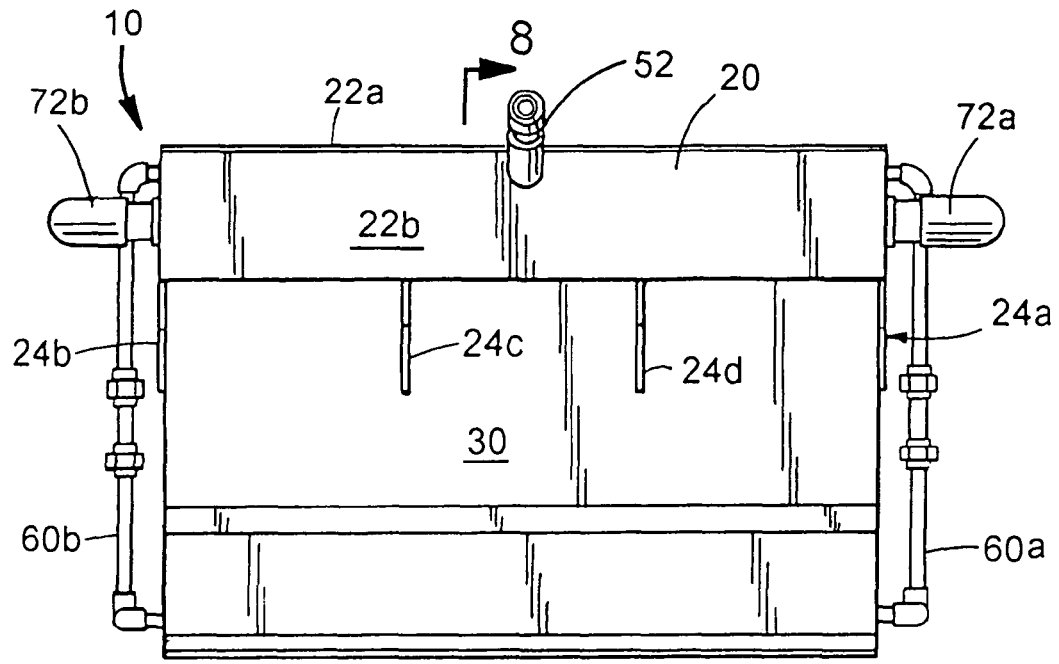
FIG. 7 is a front view of the floatatable aerator system in accordance with the present invention.

The floatatable aerator chassis 20 has a side profile that resembles a "T"-shape (see FIG. 4) and a top view that resembles a "U"-shape (see FIG. 3). The flotatable aerator chassis 20 comprises a top hollow chamber 22 bounded by a top wall 22a, front wall 22b, a concaved back wall 22c, and a bottom wall 22d. The hollow chamber 22 is supported by a plurality of baffle walls 24a, 24b, 24c and 24d. The two end baffle walls 24a, 24b serve as side walls for the hollow chamber 22 and extend past both the length and depth of the hollow chamber 22. The interior baffle walls 24c, 24d extend the length of the hollow chamber 22.

The aerator chassis 20 further includes a fluid uptake chamber 30 having a fluid intake port 32 for intaking fluid 12 and a bank of discharge ports 34a, 34b, 34c located between the plurality of baffle walls 24a, 24b, 24c and 24d. The opening of the fluid uptake chamber 30 is displaced approximately 90 degrees with respect to the openings of the discharge ports 34a, 34b, 34c.

Figure 8:
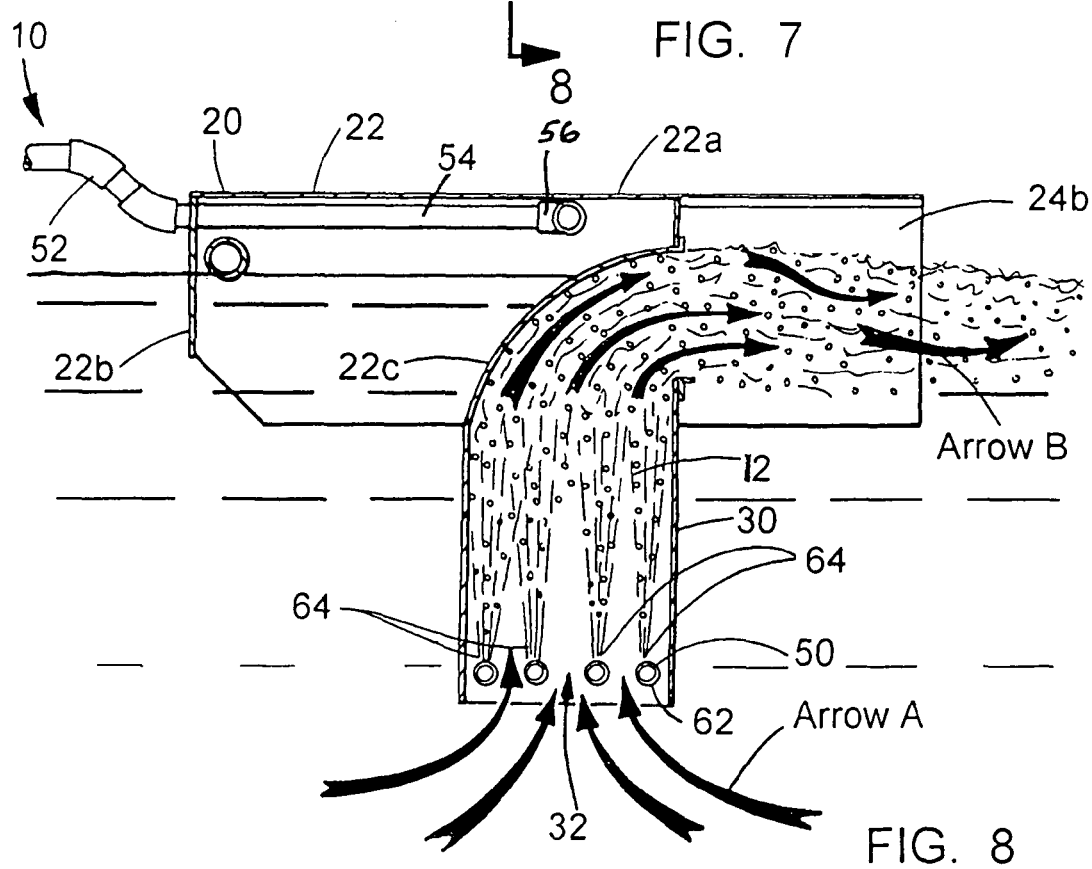
FIG. 8 is a cross-sectional view of the present invention along the plane 8-8 of FIG. 7.

The bank of discharge ports 34a, 34b, 34c share the concaved back wall 22c of the hollow chamber 22 to funnel or divert water behind the hollow chamber 22 between the two end baffle walls 24a, 24b. The concaved back wall 22c provides approximately a 90 degree elbow for the flow of aerated water in the uptake chamber 30 directly to the bank of discharge ports 34a, 34b, 34c, as best seen in FIG. 8. Arrow B in FIG. 8 shows the water discharge.

As can be readily seen the extended end baffle walls 24a, 24b create a semi-enclosed area or pool wherein aerated water collects thereinbetween.

The aerator system 50 comprises an air inlet port 52 coupled to the front wall 22b of hollow chamber 22. The inlet port 32 is adapted to be coupled to a flexible hose (not shown) which is coupled to an air or other oxygen source. The air inlet port 52 is coupled to a primary tube 54. The primary tube 54 is coupled to an air splitter 56 which divides and diverts the air flow to opposite ends of a pair of secondary tubes 58a, 58b where air flows out of the hollow chamber 22 and down vertical side tubes 60a, 60b to a plurality of spaced-apart, elongated tubular members 62. Each elongated tubular member 62 has a plurality of spaced-apart apertures 64 forming air jets which force air directly in the path of fluid 12.

The aerating system 50 receives fluid or water 12 up through the inlet port 32 (As shown by Arrows A on FIG. 8) where it is subjected to air jet streams from aerator tubular members 62. The fluid or water 12 is thus aerated and forced upward to the top of the uptake chamber 30 where a fluid diverter (concaved back wall 22c) funnels or diverts the aerated fluid out through a bank of discharge ports 34a, 34b, 34c.

In the preferred embodiment, the uptake chamber 30 is approximately in the center of the length of the two end baffle walls 24a, 24b.

The flotatable aerator 10 further includes a flotation device 70 for suspending the aerator in water so that an upper portion of the hollow chamber 22 remains above water and, preferably, the inlet port 32 remains above the subterranean earth disposed on the bottom of, e.g., a pond or like water body.

The flotation device 70 comprises a pair of exterior float members 72a, 72b extending along the baffle walls 24a, 24b exterior to the hollow chamber 22. The opposite ends of each of the exterior float members 72a, 72b couple to the baffle walls 24a, 24b. The forward end of float members 72a, 72b couple to a front float member 74 that extends between baffle walls 24a, 24b.

The float members 72a, 72b and front float member 74 may be hollow or made of a buoyant material.

By way of general explanation, the present invention requires an anchoring system to maintain its position on the surface of the water, otherwise it could move in the water. Its floating capability may be due to lightweight floatatable PVC, top hollow chamber, or a flotation device.

Figure 9:
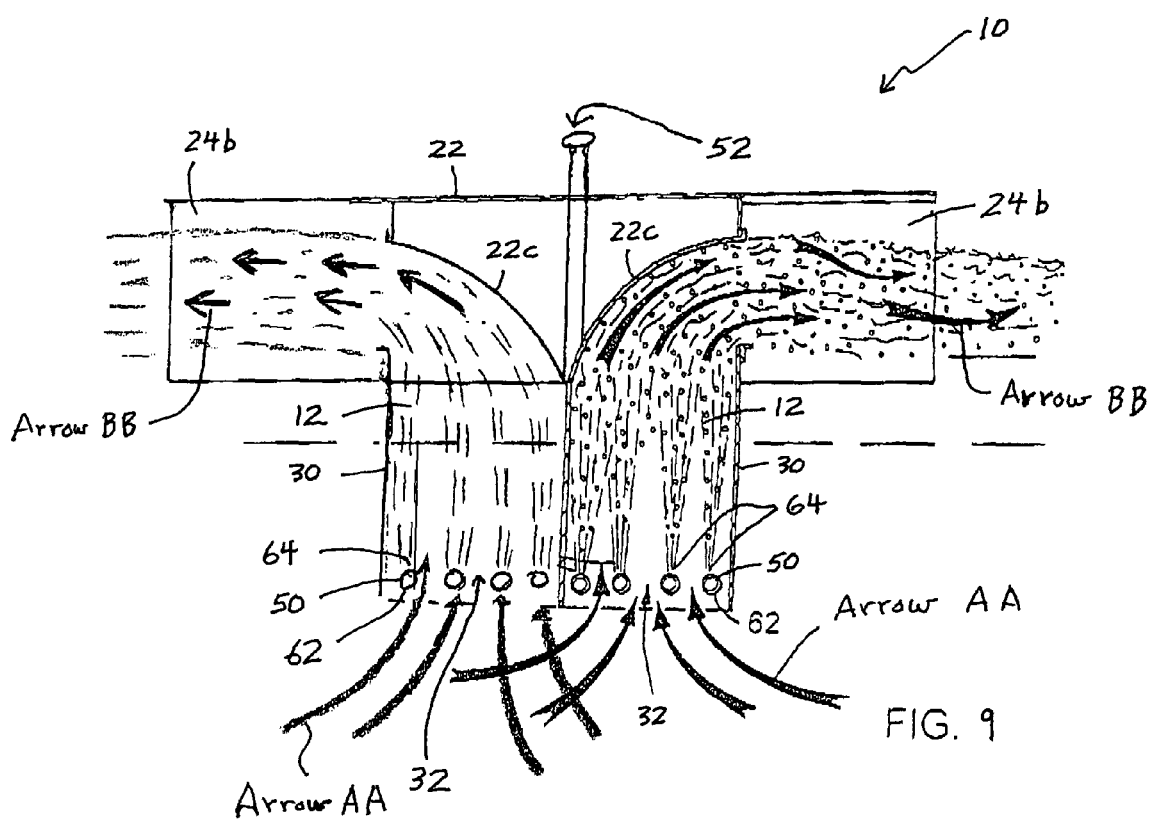
FIG. 9 is a cross-sectional view of another embodiment of the present invention taken along a plane similar to FIG. 8.

Turning to FIG. 9, therein is shown an alternative embodiment of the present invention 10 having oppositely disposed dual water discharges at Arrows BB, however, in most other respects this embodiment is similar to the previous embodiments. Arrows AA show the water inlet. Also shown are centrally disposed hollow chamber 22, fluid 12, two concaved walls 22c, two baffle walls 24b, two inlet ports 32, two fluid uptake chambers 30, two aerating systems 50, two sets of elongated tubular members 62, spaced apart apertures 64 and air inlet 52.

Because many varying and different embodiments may be made within the scope of the inventive concept herein taught and because many modifications may be made in the embodiment herein detailed in accordance with the descriptive requirements of the law, it is to be understood that the details herein are to be interpreted as illustrative and not in a limiting sense.

I claim:

1. An apparatus for providing a flotatable aerator system for aerating fluid in a reservoir or pond, comprising:
   a) a hollow chamber supported by floats, said hollow chamber having a top wall, a front wall, and a pair of end baffle walls on opposite sides of said top wall, said end baffle walls extending beyond a rear end of said top wall, each of said floats comprising an extended, exterior float member spaced from an end baffle wall with supports extending out from each end baffle wall connected to front and rear ends of each said float member;
   b) a downwardly extending fluid uptake chamber having a fluid inlet port at a bottom thereof located between front and rear ends of said end baffle walls, and extending a full width of said hollow chamber between said end baffle walls;
   c) a plurality of spaced elongated tubular members located within said fluid uptake chamber adjacent said fluid inlet port and extending the full width of said fluid uptake chamber, said tubular members extending out through said end baffle walls and communicating with each other outside of said fluid uptake chamber, each said tubular member having spaced apart apertures for injecting air into said fluid;
   d) means for supplying air to said tubular members for aerating said fluid; and
   e) a concaved back wall of said hollow chamber located at an upper end of said fluid uptake chamber for directing flowing fluid back directly into said reservoir or pond, said flowing fluid being directed into a semi-enclosed pool formed between said end baffle walls extending beyond said rear end of said top wall.

2. The apparatus of claim 1, further comprising a plurality of parallel baffle walls under said top wall between said end baffle walls extending from said front wall to said concaved back wall.

3. The apparatus of claim 2, wherein:
  said interior a side view of the apparatus resembles a T-shape; and a top view of the apparatus resembles a U-shape.
4. The apparatus of claim 1, further comprising:
  a) said hollow chamber supported by floats having a first and second fluid intake chamber having a first and second fluid inlet and a top aerated fluid diverter having a first and second concaved surface;
  b) a first and second fluid aerator assembly for injecting air into the fluid received through said first and second fluid inlet to form aerated fluid; and,
  c) first and second oppositely disposed lateral outlet ports for expelling the diverted aerated fluid.
5. An apparatus for providing a floatatable aerator system for aerating fluid in a reservoir or pond, comprising:
  a) a hollow chamber support by floats, said chamber having a concaved rear surface;
  b) a downwardly extending fluid uptake chamber having a fluid inlet port at a bottom thereof and a top terminating at said concaved rear surface;
  c) a fluid aerator assembly for injecting air into the fluid received through the fluid inlet port to form aerated fluid; and,
  d) a bank of lateral outlet ports extending from said concaved rear surface for diverting and expelling aerated fluid directly back into said reservoir or pond in a semi-enclosed pool formed by end baffle walls forming side walls of said chamber, said end baffle walls extending beyond a top wall of said chamber.
6. The apparatus of claim 5, wherein said fluid aerator assembly comprises spaced-apart, elongated tubular members, each elongated tubular member having a plurality of spaced-apart apertures to form air jets.
7. The apparatus of claim 6, wherein said floats are coupled to said two end baffle walls.
8. The apparatus of claim 7, wherein:
  interior baffle walls extend from said front wall to said concaved rear surface of said hollow chamber.
9. The apparatus of claim 8, wherein:
  a) a side view of the apparatus resembles a T-shape; and,
  b) a top view of the apparatus resembles a U-shape.
10. A method for providing a floatatable aerator system for aerating fluid in a reservoir or pond, comprising:
  a) providing a hollow chamber supported by floats, the hollow chamber having a concaved rear surface;
  b) providing a fluid uptake chamber having a fluid inlet port and a top aerated fluid diverter created by the concaved rear surface;
  c) providing a fluid aerator assembly for injecting air into the fluid received through the fluid inlet port to form aerated fluid; and,
  d) providing a bank of lateral outlet ports for expelling the diverted aerated fluid funneled along the concaved rear surface back directly into said reservoir or pond in a semi-enclosed pool formed by end baffle walls forming side walls of said chamber, said end baffle walls extending beyond said concaved rear surface and a top wall of said chamber.
11. The method of claim 10, wherein the fluid aerator assembly comprises spaced-apart, elongated tubular members, wherein each elongated tubular member has a plurality of spaced-apart apertures to form air jets.
12. The method of claim 11, further comprising the steps of providing a plurality of interior parallel baffle walls two end baffle in said hollow chamber, wherein the floats are coupled to the two end baffle walls, wherein the interior baffle walls extend from the front wall to the concaved rear surface of the hollow chamber.
13. The method of claim 12, wherein a side view resembles a T-shape and a top view resembles a U-shape.
14. The apparatus of claim 1 in which said means for supplying air comprises an input port in said front wall to receive said air, a primary tube within said hollow chamber connected to said input port to convey said air to secondary tubes for delivering said air to vertically extending tubes located outside of said end baffle walls extending downwardly between said flotation members and said end baffle walls and communicating with distal ends of said tubular members for conveying said air to said tubular members.

* * * * *